(12) United States Patent
Kim et al.

(10) Patent No.: US 8,786,789 B2
(45) Date of Patent: Jul. 22, 2014

(54) 3-DIMENSIONAL IMAGE DISPLAY DEVICE

(75) Inventors: Jung-Won Kim, Seoul (KR); Jun-Pyo Lee, Asan-si (KR); Hee-Jin Choi, Seoul (KR); Bong-Hyun You, Yongin-si (KR)

(73) Assignee: Samsung Display Co., Ltd. (KR)

( * ) Notice: Subject to any disclaimer, the term of this patent is extended or adjusted under 35 U.S.C. 154(b) by 1057 days.

(21) Appl. No.: 12/691,279

(22) Filed: Jan. 21, 2010

(65) Prior Publication Data

US 2010/0289974 A1    Nov. 18, 2010

(30) Foreign Application Priority Data

May 13, 2009  (KR) .......................... 10-2009-0041669

(51) Int. Cl.
*G02F 1/1335* (2006.01)

(52) U.S. Cl.
USPC ............................................................. 349/15

(58) Field of Classification Search
USPC ............................................................. 349/15
See application file for complete search history.

(56) References Cited

U.S. PATENT DOCUMENTS

| 7,274,412 B2 | 9/2007 | Blanchard |
| 8,237,780 B2 * | 8/2012 | Schnebly et al. ............... 348/55 |
| 2005/0030301 A1 | 2/2005 | Harrold et al. |
| 2008/0284801 A1 | 11/2008 | Brigham et al. |
| 2008/0316303 A1 | 12/2008 | Chiu et al. |
| 2009/0237495 A1 * | 9/2009 | Kawahara ....................... 348/56 |

FOREIGN PATENT DOCUMENTS

| JP | 09051552 A | 2/1997 |
| JP | 2003259395 A | 9/2003 |
| JP | 2004165713 | 6/2004 |
| JP | 2004253827 A | 9/2004 |
| JP | 2005208600 | 8/2005 |
| JP | 2006157775 | 6/2006 |
| JP | 2008306335 | 12/2008 |
| KR | 1020060093610 | 8/2006 |
| KR | 1020070005093 | 1/2007 |
| KR | 100719507 | 5/2007 |
| KR | 1020090004181 | 1/2009 |
| WO | 2006030842 A1 | 3/2006 |

* cited by examiner

*Primary Examiner* — Wen-Ying P Chen

(74) *Attorney, Agent, or Firm* — Cantor Colburn LLP

(57) ABSTRACT

A stereoscopic image display device includes; a display device includes a plurality of pixels, and which displays a first image transmitted to a left eye and displays a second image transmitted to a right eye, wherein the display device displays the first image and the second image by inserting a third image representing a predetermined luminance between the first image transmitted to the left eye and the second image transmitted to the right eye.

19 Claims, 10 Drawing Sheets

3-DIMENSIONAL IMAGE DISPLAY DEVICE

This application claims priority to Korean Patent Application No. 10-2009-0041669, filed on May 13, 2009, and all the benefits accruing therefrom under 35 U.S.C. §119, the content of which in its entirety is herein incorporated by reference.

BACKGROUND OF THE INVENTION (a) Field of the Invention

The present invention relates to a stereoscopic image display device.

(b) Description of the Related Art

Fast communication services based on the information superhighway, e.g., the internet, are expected to evolve, from simpler services for hearing and speaking such as a current telephone service, to audio and video multimedia services utilizing digital terminals for processing characters, voices, and images quickly. Furthermore, such services are expected to eventually include 3D communication services that enable realistic and stereoscopic viewing and hearing, overcoming the temporal and spatial limitations of current technology.

Typically, a 3D image is expressed by a principle of stereo vision between two eyes. Binocular disparity (i.e., a disparity of image perceived at each of the two eyes that is caused because they are separated by a distance of about 65 mm) plays an important role in establishing a stereoscopic effect. That is, when left and right eyes view different 2D images and the two images are transmitted to the brain, the brain combines the two images to perceive depth from the original 2-D images. Such ability is usually called stereography.

Techniques using the binocular disparity in 3D image displays are typically categorized, depending on a necessity for spectacles, as stereoscopic schemes, examples of which include a polarization scheme and a time divisional scheme, and autostereoscopic schemes, examples of which include a parallax barrier scheme and a lenticular scheme.

Typical autostereoscopic image display devices are widely used by disposing lenticular lenses on a liquid crystal display. According to the autostereoscopic image display device, the viewer is directly shown the screen without the need for additional glasses when viewing the stereoscopic image, however the image transmitted to the right eye and the image transmitted to the left eye are not distinctly distinguished such that there is a drawback that the stereoscopic effect is decreased.

On the other hand, according to the typical stereoscopic image display device, the additional glasses must be worn such that there is a drawback that the cost is increased, however a mass of people may simultaneously enjoy 3D images from a wide variety of viewing locations, and the image transmitted to the right eye and the image transmitted to the left eye are clearly distinguished such that there is a merit that the stereoscopic effect is clearly perceived.

BRIEF SUMMARY OF THE INVENTION

An exemplary embodiment of a stereoscopic image display device according to the present invention includes; a display device which includes a plurality of pixels, and which displays a first image transmitted to a left eye and a second image transmitted to a right eye, wherein the display device displays the first image and the second image by inserting a third image representing a predetermined luminance between the first image transmitted to the left eye and the second image transmitted to the right eye, and wherein at least one pixel in the first image transmitted to the left eye and at least one pixel in the second image transmitted to the right eye overlap each other, and at least one pixel in the first image transmitted to the left eye and at least one pixel in the second image transmitted to the right eye do not overlap each other, may be respectively applied with different data voltages in order to display substantially the same luminance.

In one exemplary embodiment, the data voltage applied to the at least one pixel of the first image transmitted to the left eye and the at least one pixel of the second image transmitted to the right eye which do not overlap with each other may be applied by converting input data into the data voltage after amending the input data.

In one exemplary embodiment, the data voltage applied to the at least one pixel of the first image transmitted to the left eye and the at least one pixel of the second image transmitted to the right eye which are overlapped with each other may be applied by converting the input data into the data voltage in a non-amended state.

In one exemplary embodiment, when the data corresponding to a pixel of the plurality of pixels that is first displayed among the first image transmitted to the left eye and the second image transmitted to the right eye is referred to as first data, and data that is displayed secondly is referred to as second data, and the second data may be amended based on a luminance value of the first data and a luminance value of the second data and is converted into the data voltage to apply it to the pixel.

In one exemplary embodiment, the amendment of the second data may be executed to change a luminance of the pixel from a luminance of the third image to the luminance represented by the second data.

In one exemplary embodiment, the amendment of the second data may be executed by a lookup table which stores an amended luminance value of the second data based on the luminance values of the first data and the second data.

In one exemplary embodiment, when the first data represents a low luminance and the second data represents a high luminance, the amended second data may represent a higher luminance than the second data.

In one exemplary embodiment, when the first data represents the high luminance and the second data represents the low luminance, the amended second data may represent a luminance that is lower than that of the second data.

In one exemplary embodiment, the predetermined luminance of the third image may represent a black image.

In one exemplary embodiment, the first image transmitted to the left eye may be applied to a pixel of the plurality of pixels as a left image data voltage and the second image transmitted to the right eye may be applied to the pixel as a right image data voltage, the third image may be applied to the pixel as an inserting data voltage, and the pixel may be applied with the data voltage in the sequence of the left image data voltage, the inserting data voltage, the right image data voltage, and the inserting data voltage.

In one exemplary embodiment, the predetermined luminance of the third image may represent a black image.

In one exemplary embodiment, the inserting data voltage may be a predetermined voltage representing a higher luminance than a black image.

In one exemplary embodiment, when a difference between the left image data voltage and the right image data voltage is more than a predetermined range, the inserting data voltage may be applied with a voltage value representing a higher luminance than a black image.

In one exemplary embodiment, the inserting data voltage may be determined to be the luminance represented by selecting the left image data voltage and the right image data voltage to be equally different from the inserting data voltage.

In one exemplary embodiment, when a gray represented by one of the left image data voltage and the right image data voltage is less than a maximum black gray and a gray represented by the remaining one of the left image data voltage and the right image data voltage is larger than a minimum white gray, the inserting data voltage may be applied with a value representing the luminance that is higher than a black image.

In one exemplary embodiment, the inserting data voltage may be determined to be the luminance represented by selecting the left image data voltage and the right image data voltage to be equally different from the inserting data voltage.

In one exemplary embodiment, the display device may further include; a liquid crystal panel having a liquid crystal layer, and a backlight unit.

In one exemplary embodiment, the stereoscopic image display device may further include; spectacles including a pair of lens that are alternately turned on and off and are synchronized to each other for the display device to alternately display the image transmitted to the left eye and the image transmitted to the right eye, and for the spectacles to alternately turn a lens on and off.

In one exemplary embodiment, the spectacles and the display device may be synchronized with at least one of IR communication, wireless communication and Bluetooth™.

According to an exemplary embodiment of the present invention, the stereoscopic image display device clearly distinguishes the image transmitted to the left eye and the image transmitted to the right eye such that display problems generated due to the characteristics of the liquid crystal display are eliminated, and thereby the display quality of the stereoscopic image is improved.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION OF THE INVENTION

Figure 1A:
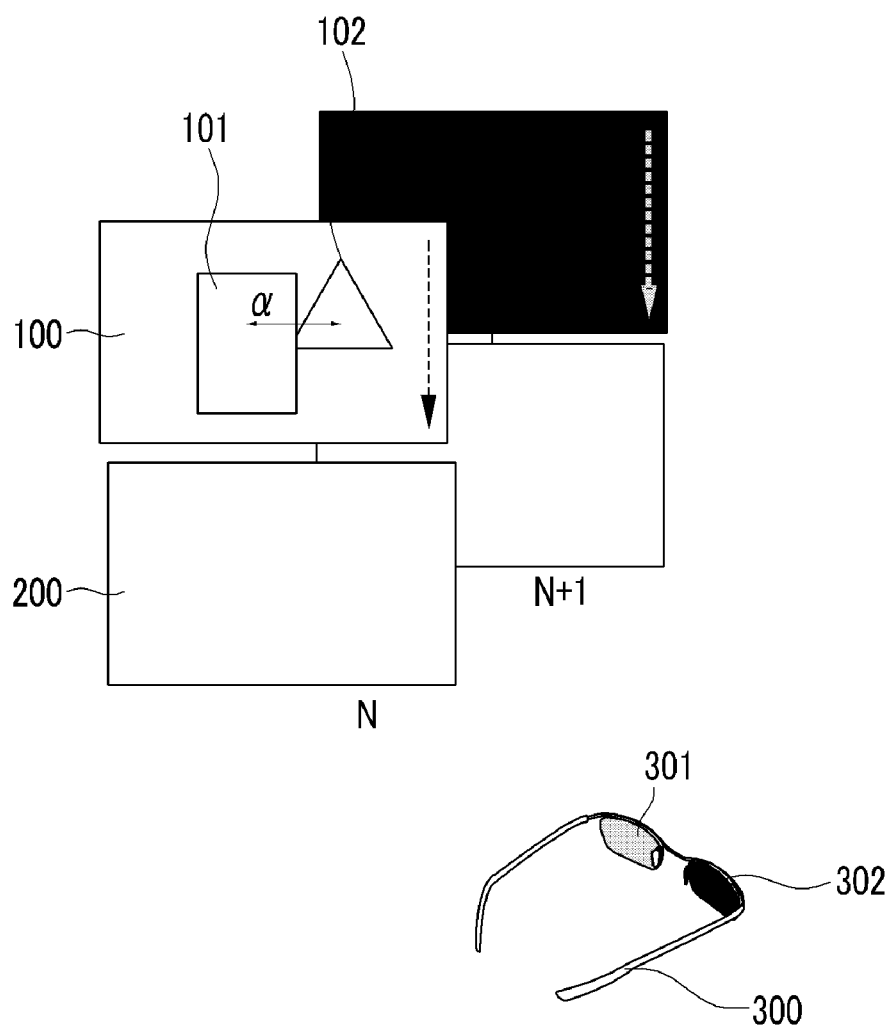
FIG. 1 is a schematic diagram showing an exemplary embodiment of an operation of an exemplary embodiment of a stereoscopic image display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be described in detail with reference to the accompanying drawings.

Figure 1B:
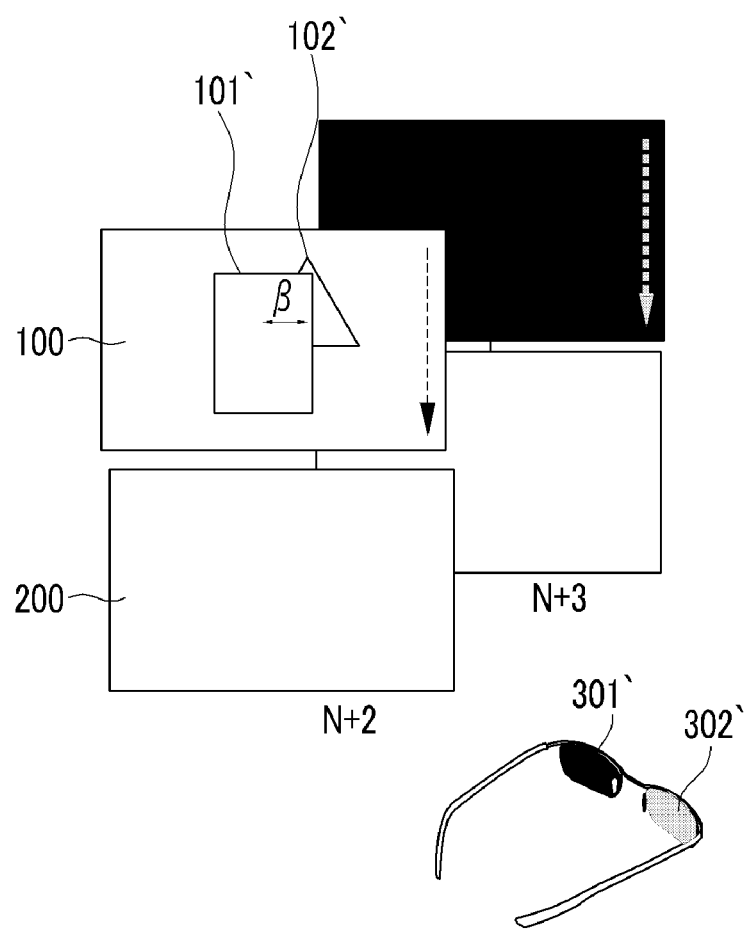
Figure 2:
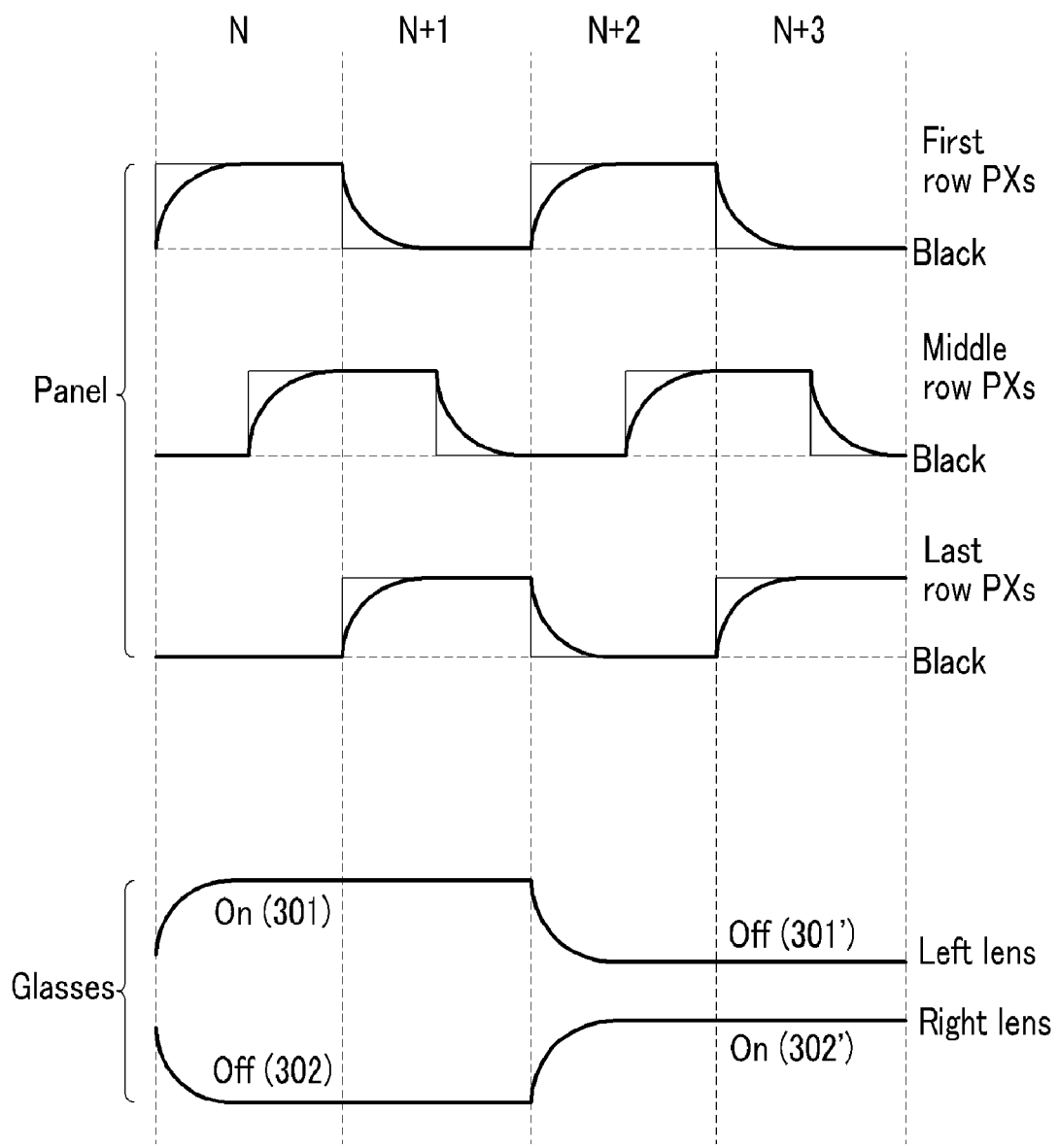
FIG. 2 is a graph showing a signal waveform of an exemplary embodiment of a stereoscopic image display device of FIG. 1.

FIG. 1 is a schematic diagram showing an exemplary embodiment of an operation of an exemplary embodiment of a stereoscopic image display device according to the present invention, and FIG. 2 is a graph showing a signal waveform of a stereoscopic image display device according to the exemplary embodiment of FIG. 1.

An exemplary embodiment of a stereoscopic image display device according to the present invention includes a display device including a display panel 100 and a backlight unit 200, and spectacles 300. Exemplary embodiments of the display device, including the display panel 100 and the backlight unit 200 may include a liquid crystal display ("LCD"), an organic light emitting device, or various other display types. Hereafter the display panel 100 and the backlight unit 200 will be described as LCDs as one exemplary embodiment, however, the present invention is not limited thereto.

An exemplary embodiment of an LCD for use as the display panel 100 includes a liquid crystal panel 100 and a backlight unit 200.

In one exemplary embodiment, the liquid crystal panel 100 includes a plurality of pixels, and displays images by changing a liquid crystal alignment direction within the liquid crystal panel by generating an electric field between two electrodes and thereby controlling a transmittance of light therethrough.

Various exemplary embodiments of the liquid crystal panel 100 may be presented according to the present invention. A representative exemplary embodiment will be described below.

An exemplary embodiment of a liquid crystal panel 100 according to the present invention includes an upper substrate, a lower substrate facing the upper substrate, and a liquid crystal layer interposed between the upper substrate and the lower substrate (not shown).

First, the lower substrate is formed with at least one gate line, at least one data line, a pixel electrode, and a thin film transistor connected to the at least one gate line and the at least one data line. The thin film transistor controls a voltage to be applied to the pixel electrode based on signals applied to the gate line and the data line, where if the voltage input through the gate line is more than a threshold voltage, the voltage input through the data line is transmitted from the source of the thin film transistor to the drain thereof, and the thin film transistor controls for the corresponding voltage to be applied to the pixel electrode connected to the drain electrode of the thin film transistor. According to the present exemplary embodiment, the pixel electrode may be formed with a transflective pixel electrode having a transmittance region where light may pass therethrough and a reflective region which reflects a majority of the light incident thereupon. Also, exemplary embodiments include configurations wherein a storage capacitance capacitor may be added to maintain the voltage applied to the pixel electrode during a predetermined time. Exemplary embodiments include configurations wherein a thin film transistor and a pixel electrode are disposed within every pixel of a multi-pixel display.

Exemplary embodiments of the liquid crystal panel also include configurations wherein the upper substrate facing the lower substrate includes a black matrix, a color filter, and a common electrode.

In the present exemplary embodiment, the liquid crystal layer interposed between the upper substrate and the lower substrate uses a vertically aligned ("VA") mode liquid crystal that is aligned vertical to the surface of the substrate when the electric field is not applied between the common electrode and the pixel electrode. Alternative exemplary embodiments include configurations wherein the liquid crystal layer may have a twisted nematic ("TN") mode, or an electrically controlled birefringence ("ECB") mode.

In the present exemplary embodiment, polarizers are respectively attached on an outer surface of the upper substrate and the lower substrate, and exemplary embodiments also include configurations wherein a compensation film may be added between the surface of the substrate and the polarizer.

According to alternative exemplary embodiments, at least one of the color filter, the black matrix, and the common electrode formed in the upper substrate may be formed in the lower substrate, and in the alternative exemplary embodiment wherein the common electrode and the pixel electrode are both formed in the lower substrate, at least one of the two electrodes may be formed with a linear electrode.

The backlight unit 200 is used to provide light to the liquid crystal panel 100, and includes a light source. Exemplary embodiments of the light source may include a compact fluorescent light, a light emitting diode ("LED"), etc. Exemplary embodiments include configurations wherein a reflector, a light guide, and a luminance improvement film may be added to guide the light emitted from the light source to the liquid crystal panel.

The light incident to the liquid crystal panel from the backlight unit is selectively transmitted or blocked by the liquid crystal panel such that gray levels are represented according to the degree of the transmittance of the light through an individual pixel.

The spectacles 300 are formed with right lenses 302 and 302' and left lenses 301 and 301', respectively to alternately block the light with a predetermined period from the liquid crystal panel. That is, the light is first blocked (e.g., the light is in an off-state) by the right lens 302 and the light is transmitted (e.g., the light is in an on-state) through the left lens 301. Next, as represented by the elements having an apostrophe, when the light is transmitted through the right lens 302', the light is blocked by the left lens 301'. As a result, the images are perceived through only the left eye during a pre-determined time (FIG. 1A), and then the images are perceived through only the right eye during a subsequent pre-determined time (FIG. 1B). The stereoscopic images are recognized through the difference between the images that are recognized through the right and left eyes, e.g., the images displayed during the first pre-determined time and the second pre-determined time may be altered in order to create a stereoscopic perception by a user of the spectacles 300.

As described above, when the lenses 301 and 302 of the spectacles 300 are on/off, the liquid crystal panel 100 respectively displays the images to be transmitted to the left eye and the right eye corresponding thereto.

For this purpose, the liquid crystal panel 100 respectively displays the images to be transmitted to the left eye and the right eye. Here, to divide the images to be transmitted to the left eye and the right eye from one another, black data is inserted between the two images.

That is, the liquid crystal panel 100 displays the images to be transmitted to the left eye as follows, referring to the N and N+1 frames of FIG. 2 and FIG. 1A.

In the Nth frame, by sequentially applying the gate-on voltage to the gate line, the data voltage is applied to the pixel electrode through the thin film transistor connected to the corresponding gate line and data line. Here, the applied data voltage is a data voltage to display the images to be transmitted to the left eye (hereinafter referred to as a left data voltage), and the applied left data voltage is uniformly maintained through the storage capacitance capacitor, in the exemplary embodiment wherein the storage capacitance capacitor is included. In FIG. 2, data voltages only for the first row pixels (PXs), the middle row pixels (PXs) and the last row pixels (PXs) are illustrated. The panel 100 of Nth frame in FIG. 1A illustrates what the panel 100 displays just after finishing data voltages application to the last row pixels (PXs). The other frames of FIGS. 1 and 2 are the same as the above explanations of the Nth frame.

Referring to N+1 frame of FIG. 2, the gate-on voltage is again sequentially applied to the gate line such that a black data voltage is applied to the pixel electrode through the thin film transistor connected to the corresponding gate line. Here, the applied black data voltage represents the black image that is inserted between the images to be transmitted to the left eye and the images to be transmitted to the right eye, thereby easily dividing the two images. The applied black data voltage is also maintained through the storage capacitance capacitor during the predetermined time.

Referring to the N+2 and N+3 frames of FIG. 2 and FIG. 1B, the liquid crystal panel 100 displays the images to be transmitted to the right eye as follows.

Referring to the N+2 and N+3 frames of FIG. 2 the data voltage is applied to the pixel electrode through the thin film transistor connected to the corresponding gate line by sequentially applying the gate-on voltage to the gate line. Here, the applied data voltage is a data voltage to display the images to be transmitted to the right eye (hereinafter referred to as a right data voltage), and the applied right data voltage is uniformly maintained through the storage capacitance capacitor, referring to the N+2 frame of FIG. 2, in the exemplary embodiment wherein the storage capacitance capacitor is present.

Next, the gate-on voltage is again sequentially applied to the gate line such that a black data voltage is applied to the pixel electrode through the thin film transistor connected to the corresponding gate line. Here, the applied black data voltage represents the black image that is inserted between the images to be transmitted to the left eye and the images to be transmitted to the right eye, thereby easily dividing two images. The applied black data voltage is also maintained through the storage capacitance capacitor during the predetermined time referring to the N+3 frame of FIG. 2.

Referring to FIG. 1, the relationship between the operation of the liquid crystal panel and the on/off operation of the spectacles is shown in detail. Here, the arrow direction shown in the liquid crystal panel 100 indicates the application sequence of the gate-on voltage to the gate line. That is, in an exemplary embodiment of the present invention, the gate-on voltage is sequentially applied from the upper gate line of the panel.

In FIG. 1, the liquid crystal panel 100 and the backlight unit 200 are shown in an arrangement wherein the liquid crystal panel 100 is disposed above the backlight unit 200, however alternative exemplary embodiments include configurations wherein the backlight unit 200 may be disposed on the rear surface of the liquid crystal panel 100. Four illustrations of the liquid crystal panel 100 and the backlight unit 200 are shown in FIG. 1, and the illustrations respectively represent a state of the N frame displaying the images transmitted to the left eye, a state of the N+1 frame displaying the black data, a state of the N+2 frame displaying the images transmitted to the right eye, and a state of the N+3 frame displaying the black data. With respect thereto, the left lens 301 of the spectacles 300 is turned on and the right lens 302 is turned off at the N frame and the N+1 frame. Also, the left lens 301' is turned off and the right lens 302' is turned on at the N+2 frame and the N+3 frame. That is, the spectacles 300 are established for the on/off states to be changed per two frames of the liquid crystal panel 100. In an exemplary embodiment of the present invention, each frame of the liquid crystal panel 100 may have an inversion period of 240 Hz, and the spectacles 300 may have an inversion period of 120 Hz.

As a result, the images recognized through the left eye are images displayed at the N frame, that is, the images of which the quadrangle 101 and the triangle 102 are separated by the distance $\alpha$. On the other hand, the image recognized by the right eye is the image displayed at the N+2 frame, that is, the image wherein the quadrangle 101' and the triangle 102' are separated by the distance $\beta$. When the distance between the images recognized through two eyes are different, the quadrangle and the triangle are sensed as being at different distances such that the stereoscopic perspective is perceived. The perceived distance that two objects are spaced apart from each other may be controlled by controlling the distances $\alpha$ and $\beta$ that the triangle and the quadrangle are apart from each other.

As described above, the N+1 frame and the N+3 frame inserting the black data image are explained. Due to the insertion of the black data image, the division between the image to be transmitted to the left eye and the image to be transmitted to the right eye becomes clear, and this will be described with reference to FIG. 2.

Generally, if the data voltage is applied to the pixel electrode, a predetermined time is required for the liquid crystal layer to change the alignment direction according to the electric field generated due to the applied data voltage. In the panel of FIG. 2, it is indicated by the bold line that the predetermined time is required when the alignment direction of the liquid crystal layer is changed into the electric field direction. Here, a thin square waveform represents the change of the applied data voltage, that is, although the data voltage is changed, the time required until the luminance level arrives at a desired level due to a change in the alignment direction of the liquid crystal is shown. Also, a difference exists between the application time of the data voltage between the pixel row to which data voltage is first applied and the pixel row to which the data voltage is finally applied in one frame.

Therefore, when the images to be displayed are immediately subsequently displayed one after the other, e.g., there is no black frame insertion, the image that is applied to the opposite side may still be recognized during some time in the state in which the on/off of the lens of the spectacles 300 are exchanged due to the time difference between directly displaying the images transmitted to the right eye at the next frame after displaying the images transmitted to the left eye. This weakens the stereography between the two eyes such that the display quality of the stereoscopic image is deteriorated. However, according to the present invention, the black data voltage is inserted between the left data voltage and the right data voltage such that the left eye perceives only the image transmitted to the left eye and the black data image and the right eye perceives only the image transmitted to the right eye and the black data image, thereby maintaining the stereography between the two eyes. As a result, the display quality of the stereoscopic image is improved.

As described above, in an exemplary embodiment of the present invention, the black data voltage is inserted between the left data voltage and the right data voltage. However, although it is referred to as the black data voltage above, alternative exemplary embodiments include configuration wherein the inserted data voltage may be a data voltage representing a higher luminance than black. Various data voltages may be applied instead of the black data voltage according to an exemplary embodiment of the present invention.

Next, variations of the data voltage applied to the liquid crystal panel will be described with reference to FIG. 3 to FIG. 8.

Figure 3:
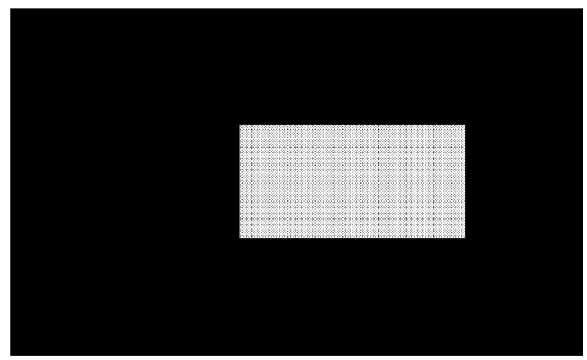
FIG. 3 and FIG. 4 are schematic views showing images to be displayed in an exemplary embodiment of the present invention.
Figure 4:
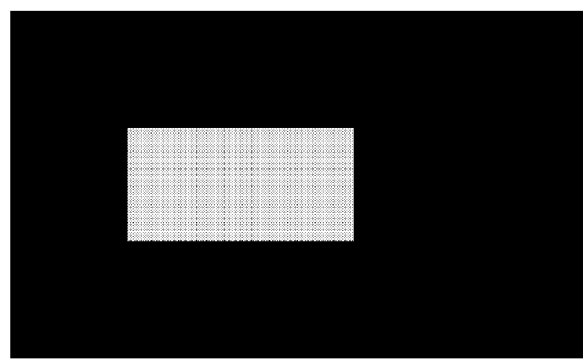
Figure 5:
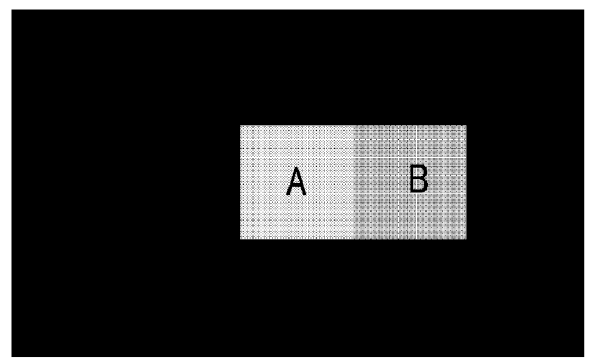
FIG. 5 and FIG. 6 are schematic views showing images that are actually displayed according to the present exemplary embodiments in FIG. 3 and FIG. 4.
Figure 6:
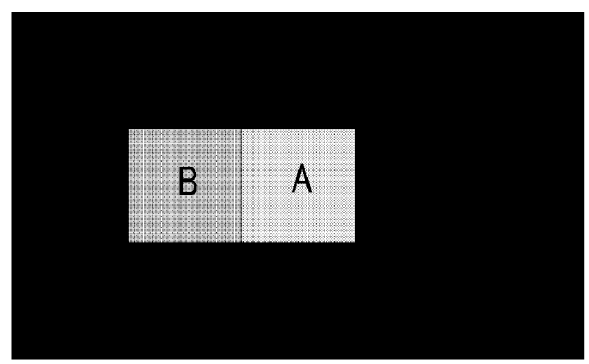
Figure 7:
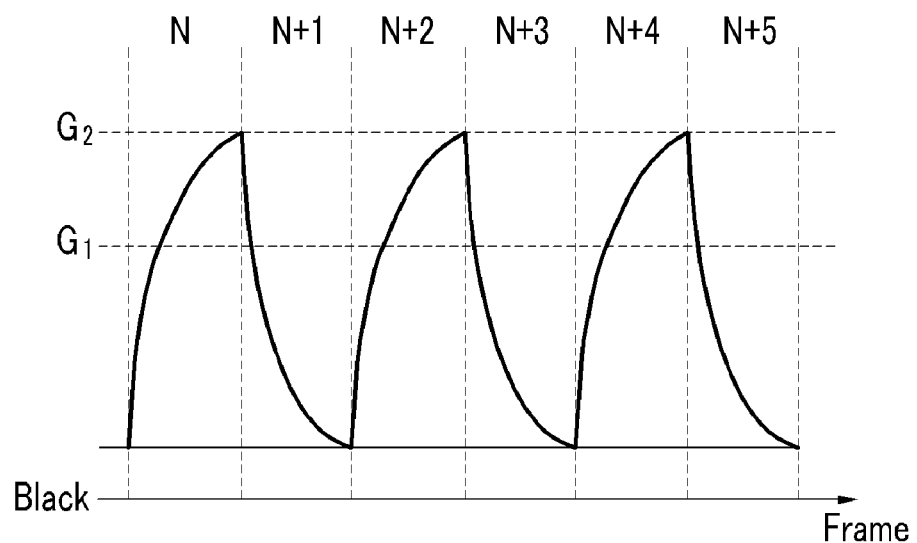
FIG. 7 is a graph showing a luminance level that is changed in an A region of FIG. 5 and FIG. 6.
Figure 8:
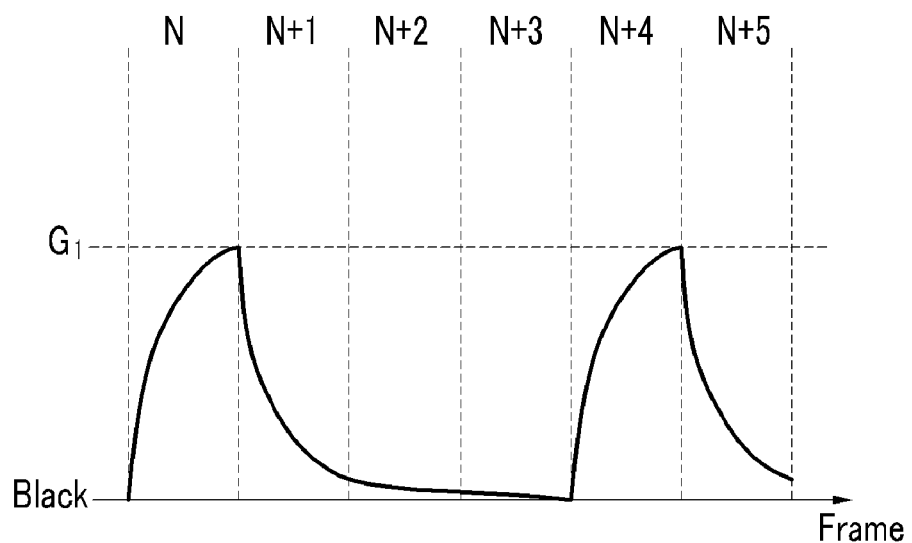
FIG. 8 is a graph showing a luminance level that is changed in a B region of FIG. 6.

FIG. 3 and FIG. 4 are views showing images to be displayed in an exemplary embodiment of the present invention, FIG. 5 and FIG. 6 are views showing images that are actually displayed in the exemplary embodiments in FIG. 3 and FIG. 4, FIG. 7 is a graph showing a luminance level that is changed in an A region of FIG. 5 and FIG. 6, and FIG. 8 is a graph showing a luminance level that is changed in a B region of FIG. 6.

FIG. 3 shows an exemplary embodiment of a liquid crystal panel displaying the image transmitted to the left eye at the N frame, and FIG. 4 shows an exemplary embodiment of a liquid crystal panel displaying the image transmitted to the right eye at the N+3 frame.

FIG. 3 and FIG. 4 include an overlapping region (i.e., the region labeled A in FIGS. 5 and 6), and a non-overlapping region (i.e., the region labeled B in FIG. 5 and FIG. 6).

If the voltage is applied to the liquid crystal panel to display the image as shown in FIG. 3 and FIG. 4, the image as shown in FIG. 5 and FIG. 6 is actually displayed. That is, an A region where both the image transmitted to the left eye and the image transmitted to the right eye are overlapped with each other is represented with a luminance G2 to be displayed. However, a B region where two images are not overlapped with each other is represented with a luminance G1 that is less than the luminance to be displayed.

The reasons are respectively shown in FIG. 7 and FIG. 8.

In FIG. 7 and FIG. 8, the change of the luminance level is shown with reference to the frame, G2 is the luminance level to be displayed, and G1 is the luminance level of less than that of G2.

Firstly, the change of the luminance level of the A region will be described through FIG. 7.

The A region is applied with the image data voltage displaying the image in the N frame, the black data voltage is applied in the N+1 frame, the image data voltage is again equally applied in the N+2 frame, and the black data voltage is applied in the N+3 frame.

In the exemplary embodiment wherein the voltages are applied as described above, the change of the luminance level in the A region is generated as shown in FIG. 7. That is, the same image data voltage is applied before and after the interval in which the black data voltage is applied such that the interval in which the display luminance is decreased to the black luminance is short, thereby the luminance that is higher than the black is displayed in the N+1 frame and the N+3 frame, and therefore the luminance to be displayed may be sufficiently represented. That is, the image transmitted to the left eye and the image transmitted to the right eye appear as the target luminance.

Meanwhile, as described in the present exemplary embodiment the inserted data voltage is the black data voltage, however the displayed image represents the luminance higher than the black, and this has a result similar to an alternative exemplary embodiment wherein the data voltage for the inserted data voltage to represent the higher luminance than the black data voltage is applied.

On the other hand, the luminance level of the B region of FIG. 6 among the B region is changed as in FIG. 8. That is, the image data voltage representing the target luminance is applied in one frame among a total of four frames, e.g., the first frame N, and the black data voltage is applied in the remaining frames, e.g., N+1, N+2 and N+3, such that the period for dropping into the black is long such that the black image may be sufficiently displayed with the low luminance. However the luminance level G2 that is sufficiently high may not be displayed in the frame in which the data voltage is applied, and only the luminance level G1 of less than the luminance level G2 is displayed. As a result, the lower luminance than the luminance to be displayed may be represented. A similar effect is displayed in the B region of FIG. 5.

To eliminate the problem generated in the B region in which the image transmitted to the left eye and the image transmitted to the right eye are not overlapped like in FIG. 8, it is beneficial to compensate the voltage applied to the B region. This is shown in FIG. 9.

Figure 9:
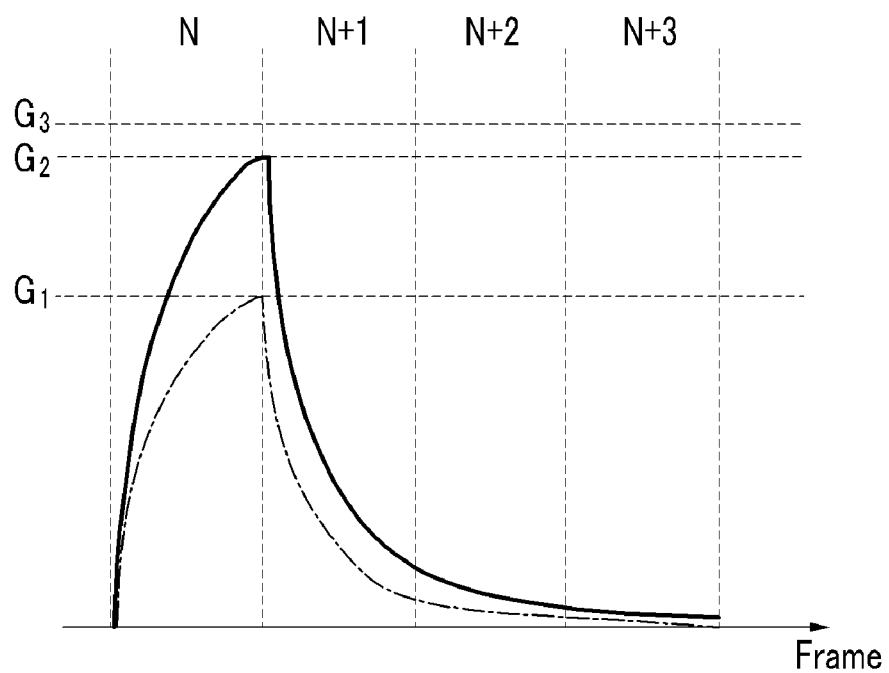
FIG. 9 is a graph showing a luminance level displayed on the B region according to an exemplary embodiment of the present invention.

FIG. 9 is a graph showing a luminance level displayed in a B region according to an exemplary embodiment of the present invention. Here, G3 represents the luminance level that is displayed in the case according to an amended data voltage, e.g., a compensated data voltage.

The luminance level G2 is to be displayed in the B region, however the response speed is too slow such that it is described that the luminance level G1 is only displayed in FIG. 8. This is the same as the graph indicated by a dotted line in FIG. 9. In this case, the data voltage (a data voltage that may display the luminance level G3 in FIG. 9) that is higher than the data voltage that is applied to the A region is generally applied for the luminance level to be quickly changed in one frame such that the luminance level G2 may be displayed (referring to the graph indicated by a solid line of FIG. 9). In other words, in order to achieve the luminance level of G2, the B region is overdriven at a luminance level of G3.

As described above, the data voltage that is applied in the B region is higher than the data voltage that is applied in the A region for the liquid crystal layer to quickly change the alignment direction, such that the target luminance may also be displayed in the B region. That is, the different data voltages are applied to the A region in which two images are overlapped with each other and the B region in which two images are not overlapped with each other, however the same luminance is displayed.

In the present exemplary embodiment, the higher data voltage is described as being applied in the A region than the B region, however the lower data voltage may be applied. That is, the compensation of the data voltage is not only to change the data voltage to be at a higher luminance level, but may also be used to change the data voltage for the alignment direction of the liquid crystal layer to be quickly changed in the other direction, e.g., the B region may be underdriven rather than overdriven.

The exemplary embodiment in which the data voltage for the image applied to the left eye and the data voltage for the image applied to the right eye are the same is described above.

Hereafter, an amendment, e.g., compensation, of the applied data voltage when applying the different voltages will be described with reference to FIG. 10 and FIG. 11.

Figure 10:
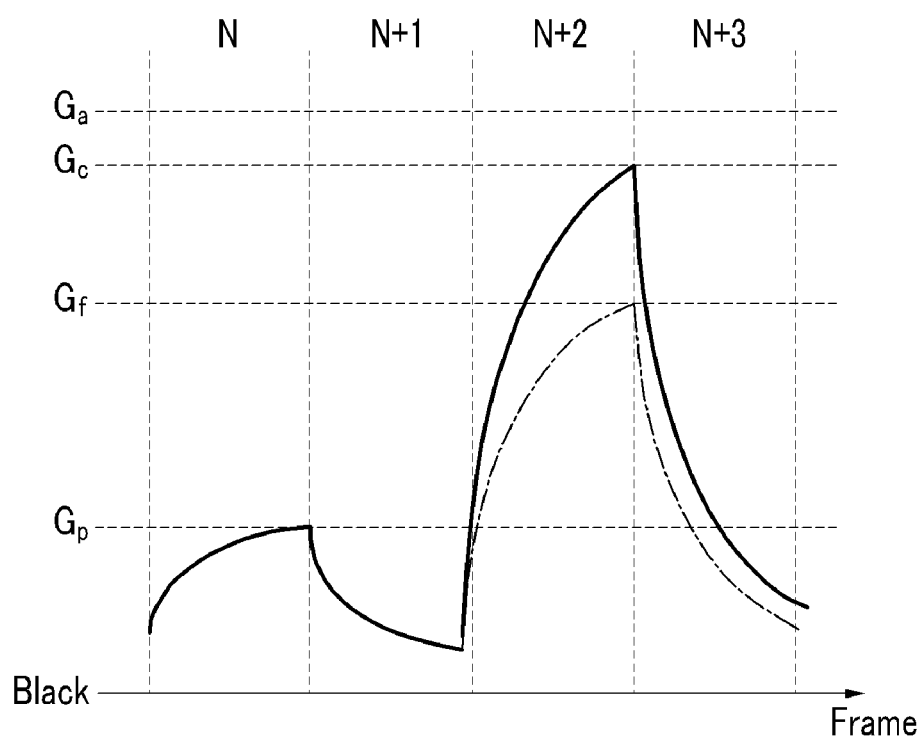
FIG. 10 and FIG. 11 are graphs showing a display luminance level according to a luminance level difference between images transmitted to a left eye and images transmitted to a right eye in an exemplary embodiment of the present invention.
Figure 11:
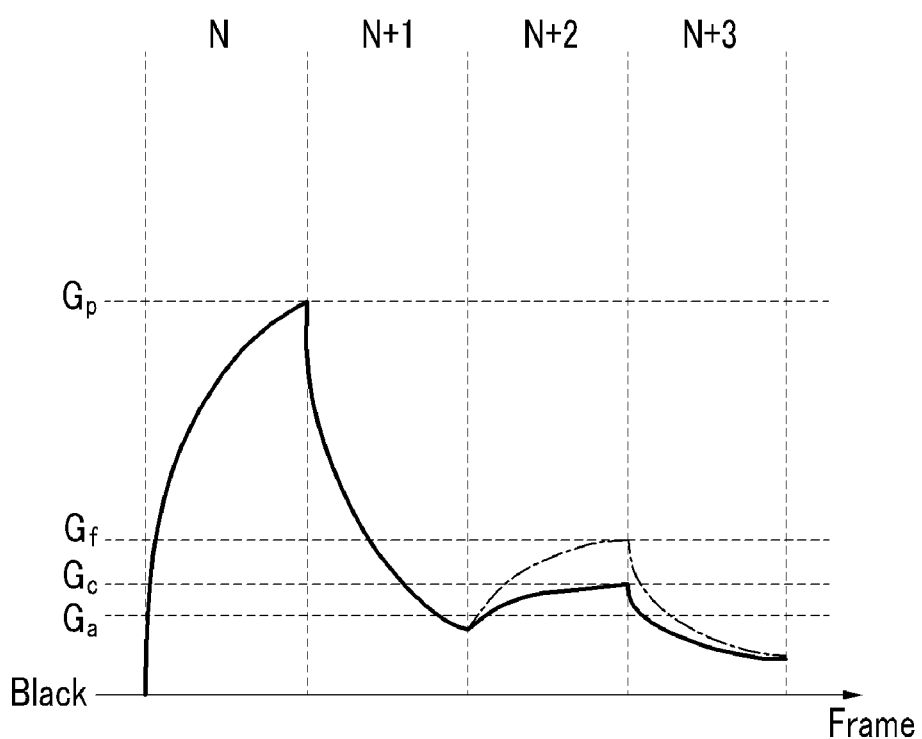

FIG. 10 and FIG. 11 are graphs showing a display luminance level according to the luminance level difference between images transmitted into a left eye and images transmitted in a right eye in an exemplary embodiment of the present invention.

First, FIG. 10 will be described. In FIG. 10, the case in which the image transmitted to the left eye displays the luminance level Gp and after then, the target image transmitted to the right eye displays the target luminance level Gc, which is greater than Gp, is shown.

If the data voltage of the target luminance level Gc is applied to the pixel during one frame, the luminance level Gf is resultantly displayed as shown by the dotted line of FIG. 10, and the target luminance level Gc is not achieved. Therefore, the data voltage displaying the luminance level Ga higher than the target luminance level Gc is applied to display the target luminance level Gc during one frame, e.g., the data voltage is overdriven in order to achieve the desired luminance.

Meanwhile, FIG. 11 shows the case in which the image transmitted to the left eye displays the luminance level Gp and after then, the target image transmitted to the right eye displays the luminance level Gc, which is smaller than Gp.

Generally, when the data voltage of the target luminance level Gc is applied to the pixel, the pixel displays like the dotted line of FIG. 11. That is, the greater luminance level Gf is displayed than the target luminance level Gc, and the luminance of the pixel is not decreased to the luminance level Gc. Inserted data (data representing the black data or the luminance higher than the black data) applied in the N+1 frame is not decreased to a sufficiently low luminance level, and as a result the relatively high luminance level Gf would be displayed in the N+2 frame. Therefore, the data voltage displaying the luminance level Ga lower than the luminance level Gc is applied for the data voltage to be decreased to the luminance level Gc during one frame.

FIG. 10 and FIG. 11 show the exemplary embodiment in which the data voltage higher than the black data is applied, however the present invention is not limited thereto, and the data voltage is amended for the desired luminance to be displayed when applying the data voltage.

Figure 12:
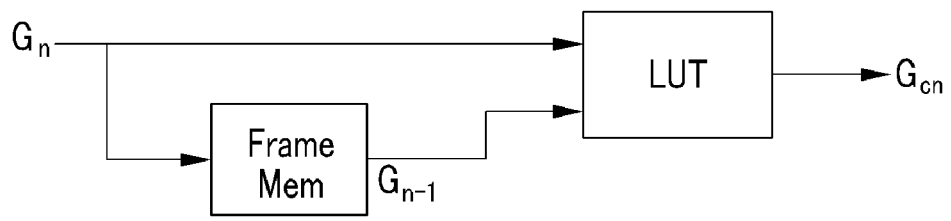
FIG. 12 is a schematic diagram showing an exemplary embodiment of an input data converter according to the present invention.

The amendment, e.g., compensation, of the data voltage as shown in FIG. 10 and FIG. 11 may be executed through a structure as in FIG. 12.

FIG. 12 is a schematic diagram showing an exemplary embodiment of an input data converter according to the present invention.

In FIG. 12, one of Gn and Gn−1 is right image data and the other is left image data, e.g., when Gn is the left image data, Gn−1 is the right image data, and when Gn is the right image data, Gn−1 is the left image data.

In FIG. 12, LUT represents a lookup table in which amendment gray data Gcn for the value of Gn and Gn−1 are stored. The amendment gray data Gcn is the data for the luminance levels of the region in which the images are overlapped with each other, and the region in which the images are not overlapped with each other in FIG. 3 to FIG. 6 to be equal to each other, and may have a value of more or less than original data as in FIG. 9 to FIG. 11.

That is, the image data Gn−1 that is firstly input is stored in a frame memory Frame Mem, and if the data Gn is input next, the amendment gray data Gcn is found in the lookup table based on Gn and Gn−1 and is output. The output amendment gray data Gcn is used as the data for displaying the images instead of the Gn data.

There is no description for the black data mentioned above, and the black data is inserted between the amendment gray data Gcn and the amendment gray data of the next frame.

The amendment gray data Gcn is changed into the data voltage, and is then applied to the data line.

The amendment of the data of FIG. 3 to FIG. 12 is for the exemplary embodiment in which the response speed of the liquid crystal layer does not follow the driving speed such that this data process may not be necessary in the liquid crystal layer that has a sufficiently fast response speed, or the applied data is quickly displayed.

It is described that the arbitrary data having the higher luminance than the black instead of the black data may be inserted above, and this will be described in more detail below.

Figure 13:
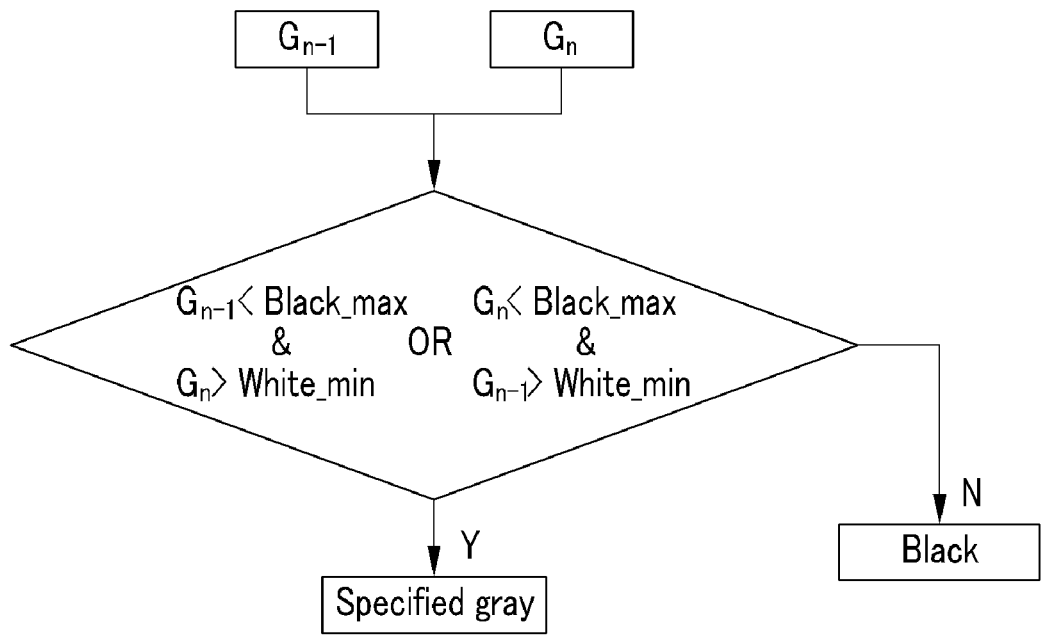
FIG. 13 is a flowchart showing an exemplary embodiment of a method for determining data insertion according to the present invention.

Generally, the black data is inserted between the left image data and the right image data, however when the difference between the left image data and the right image data is large, although the black data is applied, the black may not be displayed such that the inserting data representing the luminance higher than the black may be inserted, and this is shown as a flowchart in FIG. 13.

FIG. 13 is a flowchart showing a method for determining inserting data according to an exemplary embodiment of the present invention.

In FIG. 13, Gn−1 indicates one of the left image data and the right image data, and Gn indicates the other. Black_max is a maximum gray data value determined among the data representing a low gray, and White_min is a minimum gray data value determined among the data representing a high gray.

That is, in the case that the data is changed from the left image data to the right image data or in the opposite case, when two data do not both exist between the Black_max and the White_min, one of them is the data value of less than the Black_max, and the other is the data value of more than the White_min, it is not easy to change the luminance in one frame such that the determined inserting data (specified gray data) representing the luminance higher than the black is applied instead of the black data. As a result, the right image data or the left image data may represent the wanted display luminance.

Here, the values of the Black_max, the White_min, and the determined inserting data (specified gray data) is determined according to the period of one frame and the reaction speed of the liquid crystal layer.

As described above, in the stereoscopic image display device, it is advisable to synchronize the operation between the spectacles 300 and the display devices 100 and 200. For the synchronization, an additional synchronization signal generator is used in the display device, and a device for receiving the synchronization signal to turn on/off the lens is required in the spectacles 300. For the synchronization of the spectacles 300 and the display device, light such as infrared ray ("IR") communication may be used, or short distance wireless communication such as Bluetooth™ may also be used. Also, various exemplary embodiments to connect the spectacles 300 and the display device using a wire for the synchronization may be presented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A stereoscopic image display device comprising:
 a display device which includes a plurality of pixels, and which displays a first image transmitted to a left eye and displays a second image transmitted to a right eye,
 wherein the display device displays the first image and the second image by inserting a third image representing a predetermined luminance between the first image transmitted to the left eye and the second image transmitted to the right eye, and
 wherein at least one overlapping pixel displays the same luminance in the first image transmitted to the left eye and in the second image transmitted to the right eye, and
 at least one non-overlapping pixel displays different luminances in the first image transmitted to the left eye and in the second image transmitted to the right eye,
 and the at least one overlapping pixel and the at least one non-overlapping pixel are respectively applied with different data voltages in order to display substantially the same luminance.

2. The stereoscopic image display device of claim 1, wherein
 the data voltages applied to the at least one non-overlapping pixel is applied by converting an input data into the data voltages after amending the input data.

3. The stereoscopic image display device of claim 2, wherein
 the data voltages applied to the at least one overlapping pixel is applied by converting the input data into the data voltage in a non-amended state.

4. The stereoscopic image display device of claim 1, wherein
 when data corresponding to a pixel of the plurality of pixels that is first displayed among the first image transmitted to the left eye and the second image transmitted to the right eye is referred to as a first data, and data that is displayed secondly is referred to as a second data, and
 the second data is amended based on a luminance value of the first data and a luminance value of the second data and is converted into a data voltage to apply to the pixel.

5. The stereoscopic image display device of claim 4, wherein
 an amendment of the second data is executed to change a luminance of the pixel from a luminance of the third image to the luminance represented by the second data.

6. The stereoscopic image display device of claim 4, wherein
 the amendment of the second data is executed by a lookup table which stores an amended luminance value of the second data based on the luminance values of the first data and the second data.

7. The stereoscopic image display device of claim 4, wherein
 when the first data represents a low luminance and the second data represents a high luminance, the amended second data represents a higher luminance than the second data.

8. The stereoscopic image display device of claim 4, wherein
 when the first data represents the high luminance and the second data represents the low luminance, the amended second data represents a lower luminance than the second data.

9. The stereoscopic image display device of claim 1, wherein
 the predetermined luminance of the third image represents a black image.

10. The stereoscopic image display device of claim 1, wherein
 the first image transmitted to the left eye is applied to a pixel of the plurality of pixels as a left image data voltage and the second image transmitted to the right eye is applied to the pixel as a right image data voltage, the third image is applied to the pixel as an inserting data voltage, and
 the pixel is applied with the data voltage in the sequence of the left image data voltage, the inserting data voltage, the right image data voltage, and the inserting data voltage, and
 wherein the pixel is one of the at least one non-overlapping pixel and the at least one overlapping pixel.

11. The stereoscopic image display device of claim 10, wherein
 the predetermined luminance of the third image represents a black image.

12. The stereoscopic image display device of claim 10, wherein
 the inserting data voltage is a predetermined voltage representing a higher luminance than a black image.

13. The stereoscopic image display device of claim 10, wherein
 when a difference between the left image data voltage and the right image data voltage is more than a predetermined range, the inserting data voltage is applied with a voltage value representing a higher luminance than a black image.

14. The stereoscopic image display device of claim 13, wherein
 the inserting data voltage is determined to be the luminance represented by selecting the left image data voltage and the right image data voltage to be equally different from the inserting data voltage.

15. The stereoscopic image display device of claim 10, wherein
 when a gray represented by one of the left image data voltage and the right image data voltage is less than a maximum black gray, and a gray represented by the other of the left image data voltage and the right image data voltage is larger than a minimum white gray, the inserting data voltage is applied with a value representing the luminance higher than a black image.

16. The stereoscopic image display device of claim 15, wherein
 the inserting data voltage is determined to be the luminance represented by selecting the left image data voltage and the right image data voltage to be equally different from the inserting data voltage.

17. The stereoscopic image display device of claim 1, wherein
 a liquid crystal panel having a liquid crystal layer; and
 a backlight unit.

18. The stereoscopic image display device of claim 1, further comprising:
 spectacles including a pair of lenses that are alternately turned on and off, wherein the display device is synchronized to alternately display the image transmitted to the left eye and the image transmitted to the right eye and for the spectacles to alternately turn a lens on and off.

19. The stereoscopic image display device of claim 18, wherein
the spectacles and the display device are synchronized via wireless communication.

* * * * *